(12) United States Patent
Yan et al.

(10) Patent No.: US 12,355,901 B2
(45) Date of Patent: Jul. 8, 2025

(54) BLOCKCHAIN-BASED METHOD AND SYSTEM FOR SDP ACCESS CONTROL

(71) Applicants: CHINA MOBILE COMMUNICATIONS GROUP CO., LTD., Beijing (CN); CHINA MOBILE COMMUNICATION CO., LTD RESEARCH INSTITUTE, Beijing (CN)

(72) Inventors: Junzhi Yan, Beijing (CN); Bo Yang, Beijing (CN); Li Su, Beijing (CN); Shen He, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 102 days.

(21) Appl. No.: 18/259,795

(22) PCT Filed: Dec. 30, 2021

(86) PCT No.: PCT/CN2021/143221
§ 371 (c)(1),
(2) Date: Jun. 29, 2023

(87) PCT Pub. No.: WO2022/143935
PCT Pub. Date: Jul. 7, 2022

(65) Prior Publication Data
US 2024/0323037 A1    Sep. 26, 2024

(30) Foreign Application Priority Data

Jan. 4, 2021 (CN) .......................... 202110001453.6

(51) Int. Cl.
*H04L 29/06* (2006.01)
*H04L 9/00* (2022.01)
*H04L 9/32* (2006.01)

(52) U.S. Cl.
CPC .............. *H04L 9/3297* (2013.01); *H04L 9/50* (2022.05)

(58) Field of Classification Search
CPC ....... H04L 9/3297; H04L 9/50; H04L 9/3247; H04L 63/0876; H04L 63/10;
(Continued)

(56) References Cited

U.S. PATENT DOCUMENTS 10,972,478 B2   4/2021   Pang
11,038,682 B2   6/2021   Xie
(Continued)

FOREIGN PATENT DOCUMENTS

CN   107980216 A   5/2018
CN   109117668 A   1/2019
(Continued)

OTHER PUBLICATIONS

"Software-Defined Perimeter", Mar. 10, 2020, pp. 13-14, https://web.archive.org/web/20200825011637/https://www.cloudsecurityalliance.jp/site/wp-content/uploads/2020/03/sdp_architecture_guide_v2_J_FINAL.pdf, with concise statement of relevance.
(Continued)

*Primary Examiner* — Mahfuzur Rahman
(74) *Attorney, Agent, or Firm* — Cooper Legal Group, LLC (57) ABSTRACT

Provided in embodiments of the present disclosure are a blockchain-based method and system for SDP access control. An SDP connection accepting host transmits information of the SDP connection accepting host and a supported connection policy to a blockchain system node, performs
(Continued)

blockchain node verification and consensus, and records in a blockchain ledger; an SDP connection initiating host submits an identity authentication request to the blockchain system node; the blockchain system node verifies information of the identity authentication request, and searches for a list of SDP connection accepting hosts accessible to the SDP connection initiating host, and returns to the SDP connection initiating host; the SDP connection initiating host initiates a connection request, the connection request comprising a signature of the blockchain system node with respect to the SDP connection accepting hosts; the SDP connection accepting host verifies the connection request initiated by the SDP connection initiating host and provides an access service upon successful verification. The embodiments of the present disclosure prevent an SDP controller from coming under a DDoS attack and prevent the SDP controller from implementing an incorrect authorization.

13 Claims, 4 Drawing Sheets

(58) Field of Classification Search
CPC . H04L 9/0861; H04L 63/102; H04L 63/1458; G06F 21/606; G06F 21/64; G06F 21/31; G06F 21/45; G06F 21/602; G06F 21/604
See application file for complete search history.

(56) References Cited

U.S. PATENT DOCUMENTS

| | | | | |
|---|---|---|---|---|
| 11,190,494 | B2 * | 11/2021 | Kim | H04L 63/126 |
| 11,381,557 | B2 * | 7/2022 | Kim | H04L 63/0209 |
| 2019/0109713 | A1 * | 4/2019 | Clark | G06F 16/182 |
| 2019/0188046 | A1 * | 6/2019 | Florissi | H04L 67/10 |
| 2019/0207762 | A1 | 7/2019 | Xie | |
| 2019/0386969 | A1 * | 12/2019 | Verzun | G06F 21/606 |
| 2020/0120105 | A1 | 4/2020 | Pang | |
| 2020/0257778 | A1 | 8/2020 | Pham | |
| 2021/0029163 | A1 * | 1/2021 | Behl | H04L 67/1097 |
| 2021/0217001 | A1 * | 7/2021 | Harrison | H04L 9/50 |

FOREIGN PATENT DOCUMENTS

| | | |
|---|---|---|
| CN | 109561066 A | 4/2019 |
| CN | 110336813 A | 10/2019 |
| CN | 110809006 A | 2/2020 |
| CN | 111181944 A | 5/2020 |
| CN | 111835528 A | 10/2020 |
| EP | 3367289 A1 | 8/2018 |
| KR | 102007913 B1 | 8/2019 |
| WO | 2018214165 A1 | 11/2018 |
| WO | 2019104690 A1 | 6/2019 |

OTHER PUBLICATIONS

International Search Report in the international application No. PCT/CN2021/143221, mailed on Mar. 1, 2022. 5 pages with English translation.
International Search Report in the international application No. PCT/CN2021/143076, mailed on Mar. 14, 2022. 6 pages with English translation.
Written Opinion of the International Search Authority in the international application No. PCT/CN2021/143221, mailed on Mar. 1, 2022. 7 pages with English translation.
Written Opinion of the International Search Authority in the international application No. PCT/CN2021/143076, mailed on Mar. 14, 2022. 7 pages with English translation.
"Software-defined perimeter Wikipedia", Jul. 7, 2020 (Jul. 7, 2020), XP093154011,Retrieved from the Internet: <URL: https://en.wikipedia.org/w/index.php?title=Software-defined_perimeter&oldid=966585613 >, [retrieved on Apr. 22, 2024], the whole document, 6 pages.
Alan Boehme:"Software Defined Perimeter", Dec. 31, 2013 (Dec. 31, 2013), XP093154007, Retrieved from the Internet: URL: https://downloads. cloudsecurityallianc e. org/initiatives/sdp/Software_Defined_Per imeter. pdf, p. 6-p. 8, figures 1, 2, 13pages.
Supplementary European Search Report in the European application No. 21914665.1, mailed on May 3, 2024, 11 pages.
Xu L, et al., "DL-DP: Improving the Security of Industrial IoT with Decentralized Ledger Defined Perimeter", In: Proceedings of the 2nd ACM International Symposium on Blockchain and Secure Critical Infrastructure, Oct. 6, 2020 (pp. 53-62). 10 pages.
Junzhi Yan et al., "Blockchain based software defined perimeter (SDP) in support authentication and authorization", 2022 International Conference on Blockchain Technology and Information Security(ICBCTIS), pp. 40-42.

* cited by examiner

An SDP connection accepting host transmits to-be-verified information to a blockchain system node, the to-be-verified information including host information and a supported connection policy of the SDP connection accepting host, so that the to-be-verified information will be verified by the blockchain system node, and be recorded into a blockchain ledger after the verification is successful  — S11

The SDP connection accepting host receives a connection request transmitted by an SDP connection initiating host, the connection request including signature information made by the blockchain system node for the SDP connection accepting host in a list of SDP connection accepting hosts  — S12

The SDP connection accepting host verifies the signature information according to the supported connection policy when the SDP connection accepting host is in the list of SDP connection accepting hosts, and transmits a request response to the SDP connection initiating host after the verification is successful  — S13

BLOCKCHAIN-BASED METHOD AND SYSTEM FOR SDP ACCESS CONTROL

CROSS-REFERENCE TO RELATED APPLICATION

This application is filed based on and claims priority to Chinese Patent application filed on Jan. 4, 2021 with an application number of 202110001453.6, the content of which is hereby incorporated by reference in its entirety.

TECHNICAL FIELD

The disclosure relates to the technical field of network securities, and in particular to a method and system for blockchain-based access control of Software Defined Perimeter (SDP).

BACKGROUND

SDP is intended to enable an application owner to deploy perimeter securities as required, to isolate services from insecure networks. The SDP replaces a physical device with a logical component controllable by the application owner, and only after device authentication and identity authentication, the SDP allows access to application infrastructures.

Figure 1:
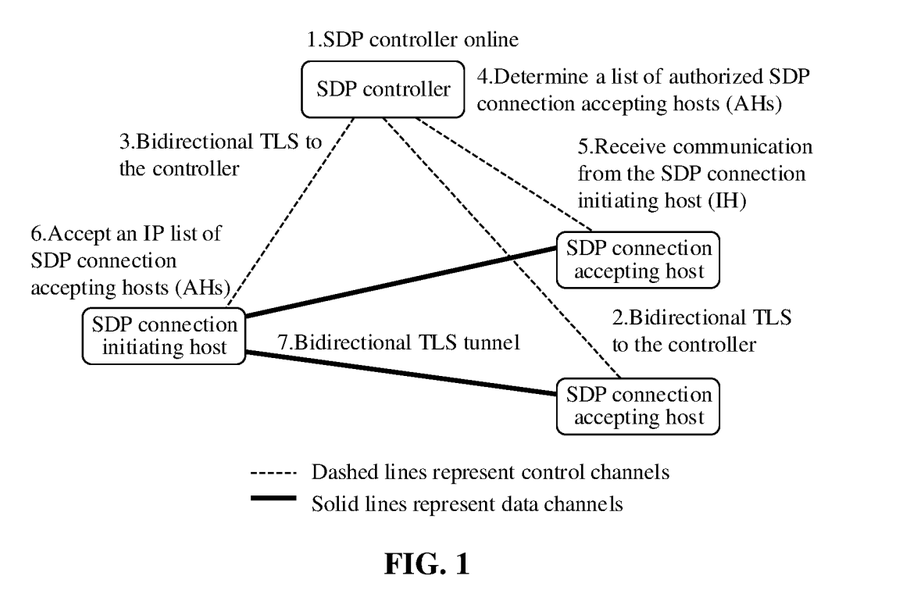
FIG. 1 is a schematic diagram of an SDP control in the related art.

With reference to FIG. 1, SDP includes two parts: an SDP host and an SDP controller. The SDP host may create a connection or accept a connection. The SDP controller is mainly responsible for host authentication and policy distribution. The SDP host interacts with the SDP controller through a secure control channel. The SDP host includes an SDP connection initiating host (IH) and an SDP connection accepting host (AH).

The SDP has changed a conventional website connection mode. In the conventional connection mode, a client needs to establish a connection with a server, which enables the server to be exposed in a public network. The server may be utilized when it has a vulnerability, for example, a user name and a password may be stolen if a user inputs the user name and the password through a login page. Furthermore, multi-factor authentication may be used in addition to the user name and the password, and loss of the user name and password may be prevented by the multi-factor authentication. However, the multi-factor authentication is not very friendly to the user.

At the present stage, in an SDP system, the SDP controller controls information such as an accessible service list of IH, an Internet Protocol (IP) address of AH, connection parameters (such as a port number, a protocol, or the like), or the like. Since the SDP controller is a centralized device, the SDP controller is exposed in the network, and is easily subjected to a network attack such as Distributed Denial of Service (DDoS), or the like. Once the controller is out of service due to the network attack, it is possible that the entire system cannot operate normally, and IH will be unable to perform any data access.

SUMMARY

The disclosure provides methods and systems for blockchain-based access control of SDP, to provide an SDP service to a customer in a blockchain manner, and solve problems that the SDP controller is attacked by DDoS and the SDP controller implements an incorrect authorization.

In order to solve the above technical problems, the disclosure is implemented as follows.

According to a first aspect, an embodiment of the disclosure provides a method for blockchain-based access control of SDP, including the following operations.

An SDP connection accepting host transmits to-be-verified information to a blockchain system node. The to-be-verified information includes host information and a supported connection policy of the SDP connection accepting host, so that the to-be-verified information will be verified by the blockchain system node, and be recorded into a blockchain ledger after the verification is successful.

The SDP connection accepting host receives a connection request transmitted by an SDP connection initiating host. The connection request includes signature information made by the blockchain system node for the SDP connection accepting host in a list of SDP connection accepting hosts.

The SDP connection accepting host verifies the signature information according to the supported connection policy when the SDP connection accepting host is in the list of SDP connection accepting hosts, and transmits a request response to the SDP connection initiating host after the verification is successful.

Preferably, the host information of the SDP connection accepting host may include at least one of: an IP address, a port, or protocol information; and the supported connection policy may include at least one of: a login identity (ID), an IP address and a geographic location of an access user, or a blockchain node verification or endorsement policy.

Preferably, the signature information made by the blockchain system node for the SDP connection accepting host in the list of SDP connection accepting hosts may include signatures made by one or more blockchain system nodes determined according to the blockchain node verification or endorsement policy.

Preferably, the to-be-verified information may further include a signature of the SDP connection accepting host for the supported connection policy and the host information.

According to a second aspect, an embodiment of the disclosure provides a method for blockchain-based access control of SDP, including the following operations.

A blockchain system node receives to-be-verified information transmitted by an SDP connection accepting host. The to-be-verified information includes host information and a supported connection policy of the SDP connection accepting host.

The blockchain system node verifies the to-be-verified information and records the information into a blockchain ledger after the verification is successful.

The blockchain system node receives an identity authentication request submitted by an SDP connection initiating host.

The blockchain system node verifies the identity authentication request, searches, in a blockchain, for a list of SDP connection accepting hosts accessible to the SDP connection initiating host after the verification is successful, and returns the list of SDP connection accepting hosts to the SDP connection initiating host.

Preferably, the to-be-verified information may further include a signature of the SDP connection accepting host for the supported connection policy and the host information.

Preferably, when the SDP connection initiating host signs a timestamp with its own private key in the identity authentication request, the operation of verifying, by the blockchain system node, the identity authentication request may include the following operation.

The blockchain system node verifies the signature and timestamp submitted by the SDP connection initiating host.

Preferably, when the identity authentication request includes a Key Derivation Function (KDF) or encrypted information of the KDF with a public key of an authentication node A1, the operation of verifying, by the blockchain system node, the identity authentication request may include the following operation.

The blockchain system node verifies whether the KDF is correct.

Preferably, when the identity authentication request includes a token or encrypted information of the token with a public key of an authentication node A2, the operation of verifying, by the blockchain system node, the identity authentication request may include the following operation.

The blockchain system node verifies whether the token is correct.

According to a third aspect, there is provided a method for blockchain-based access control of SDP, including the following operations.

An SDP connection initiating host transmits an identity authentication request to a blockchain system node.

The SDP connection initiating host receives a list of SDP connection accepting hosts accessible to the SDP connection initiating host transmitted by the blockchain system node.

The SDP connection initiating host transmits a connection request to an SDP connection accepting host in the list of SDP connection accepting hosts. The connection request includes signature information made by the blockchain system node for the SDP connection accepting host in the list of SDP connection accepting hosts.

The SDP connection initiating host receives a request response transmitted by the SDP connection accepting host.

Preferably, the SDP connection initiating host may sign a timestamp with its own private key in the identity authentication request.

Preferably, when the SDP connection initiating host and an authentication node A1 share a user name and secret information, the identity authentication request may include a KDF or encrypted information of the KDF with a public key of the authentication node A1.

Preferably, when the SDP connection initiating host has a token provided by an authentication node A2, the identity authentication request may include the token or encrypted information of the token with a public key of the authentication node A2.

Preferably, the signature information made by the blockchain system node for the SDP connection accepting host in the list of SDP connection accepting hosts may include signatures made by one or more blockchain system nodes determined according to a blockchain node verification or endorsement policy.

According to a fourth aspect, there is provided a system for blockchain-based access control of SDP, including a first information verification module, a first connection request module, and a first request response module.

The first information verification module is configured to transmit to-be-verified information to a blockchain system node. The to-be-verified information includes host information and a supported connection policy of an SDP connection accepting host, so that the to-be-verified information will be verified by the blockchain system node, and be recorded into a blockchain ledger after the verification is successful.

The first connection request module is configured to receive a connection request transmitted by an SDP connection initiating host. The connection request includes signature information made by the blockchain system node for the SDP connection accepting host in a list of SDP connection accepting hosts.

The first request response module is configured to verify the signature information according to the supported connection policy when the SDP connection accepting host is in the list of SDP connection accepting hosts, and transmit a request response to the SDP connection initiating host after the verification is successful.

Preferably, the host information of the SDP connection accepting host may include at least one of: an IP address, a port, or protocol information; and the supported connection policy may include at least one of: a login ID, an IP address and a geographic location of an access user, or a blockchain node verification or endorsement policy.

Preferably, the signature information made by the blockchain system node for the SDP connection accepting host in the list of SDP connection accepting hosts may include signatures made by one or more blockchain system nodes determined according to the blockchain node verification or endorsement policy.

Preferably, the to-be-verified information may further include a signature of the SDP connection accepting host for the supported connection policy and the host information.

According to a fifth aspect, there is provided a system for blockchain-based access control of SDP, including a second information verification module, a first identity authentication request module, and a verification feedback module.

The second information verification module is configured to: receive to-be-verified information transmitted by an SDP connection accepting host, the to-be-verified information including host information and a supported connection policy of the SDP connection accepting host; and verify the to-be-verified information and record the information into a blockchain ledger after the verification is successful.

The first identity authentication request module is configured to receive an identity authentication request submitted by an SDP connection initiating host.

The verification feedback module is configured to: verify the identity authentication request; search, in a blockchain, for a list of SDP connection accepting hosts accessible to the SDP connection initiating host after the verification is successful; and return the list of SDP connection accepting hosts to the SDP connection initiating host.

Preferably, the to-be-verified information may further include a signature of the SDP connection accepting host for the supported connection policy and the host information.

Preferably, when the SDP connection initiating host signs a timestamp with its own private key in the identity authentication request, the operation of verifying the identity authentication request may include the following operation.

The signature and timestamp submitted by the SDP connection initiating host are verified.

Preferably, when the identity authentication request includes a KDF or encrypted information of the KDF with a public key of an authentication node A1, the operation of verifying the identity authentication request may include the following operation.

Whether the KDF is correct, is verified.

Preferably, when the identity authentication request includes a token or encrypted information of the token with a public key of an authentication node A2, the operation of verifying the identity authentication request may include the following operation.

Whether the token is correct, is verified.

According to a sixth aspect, there is provided a system for blockchain-based access control of SDP, including a second identity authentication request module, a second connection request module, and a second request response module.

The second identity authentication request module is configured to transmit an identity authentication request to a blockchain system node, and receive a list of SDP connection accepting hosts accessible to an SDP connection initiating host transmitted by the blockchain system node.

The second connection request module is configured to transmit a connection request to an SDP connection accepting host in the list of SDP connection accepting hosts.

The connection request includes signature information made by the blockchain system node for the SDP connection accepting host in the list of SDP connection accepting hosts.

The second request response module is configured to receive a request response transmitted by the SDP connection accepting host.

Preferably, the SDP connection initiating host may sign a timestamp with its own private key in the identity authentication request.

Preferably, when the SDP connection initiating host and an authentication node A1 share a user name and secret information, the identity authentication request may include a KDF or encrypted information of the KDF with a public key of the authentication node A1.

Preferably, when the SDP connection initiating host has a token provided by an authentication node A2, the identity authentication request may include the token or encrypted information of the token with a public key of the authentication node A2.

Preferably, the signature information made by the blockchain system node for the SDP connection accepting host in the list of SDP connection accepting hosts may include signatures made by one or more blockchain system nodes determined according to a blockchain node verification or endorsement policy.

According to a seventh aspect, there is provided an SDP connection accepting host, including a processor and a memory having stored thereon a program executable on the processor. The processor is configured to implement operations of the method for blockchain-based access control of SDP according to the first aspect or any possible implementation thereof, when the program is executed by the processor.

According to an eighth aspect, there is provided a blockchain system node, including a processor and a memory having stored thereon a program executable on the processor. The processor is configured to implement operations of the method for blockchain-based access control of SDP according to the second aspect or any possible implementation thereof, when the program is executed by the processor.

According to a ninth aspect, there is provided an SDP connection initiating host, including a processor and a memory having stored thereon a program executable on the processor. The processor is configured to implement operations of the method for blockchain-based access control of SDP according to the third aspect or any possible implementation thereof, when the program is executed by the processor.

According to a tenth aspect, there is provided a computer-readable storage medium having stored thereon a computer program that, when being executed by a processor, causes the processor to implement operations of the method for blockchain-based access control of SDP according to the first aspect or any possible implementation thereof; or to implement operations of the method for blockchain-based access control of SDP according to the second aspect or any possible implementation thereof; or to implement operations of the method for blockchain-based access control of SDP according to the third aspect or any possible implementation thereof.

In the embodiments of the disclosure, the SDP connection accepting host transmits the host information and the supported connection policy of the SDP connection accepting host to the blockchain system node; blockchain node verification and consensus are performed on the host information and the supported connection policy of the SDP connection accepting host, and the host information and the supported connection policy of the SDP connection accepting host after subjecting to the blockchain node verification and consensus are recorded into the blockchain ledger; the SDP connection initiating host submits the identity authentication request to the blockchain system node; the blockchain system node verifies the identity authentication request submitted by the SDP connection initiating host, verification of the identity authentication request includes searching, in the blockchain, for the list of SDP connection accepting hosts accessible to the SDP connection initiating host, and the blockchain system node returns the list of SDP connection accepting hosts to the SDP connection initiating host; the SDP connection initiating host initiates the connection request to the SDP connection accepting hosts in the list of SDP connection accepting hosts, the connection request including a signature of the blockchain system node for the SDP connection accepting host in the list of SDP connection accepting hosts; and the SDP connection accepting host verifies the connection request initiated by the SDP connection initiating host, and provides an access service to the SDP connection initiating host after the verification is successful. According to the embodiments of the disclosure, SDP services are provided to the customer in a blockchain manner, and authentication, request, or the like are verified, so that on one hand, the SDP controller may be prevented from being attacked by DDoS, and on the other hand, the SDP controller may be prevented from implementing an incorrect authorization.

BRIEF DESCRIPTION OF THE DRAWINGS

Various other advantages and benefits will become apparent to those of ordinary skill in the art by reading the following detailed descriptions of preferred embodiments. The drawings are intended to illustrate the preferred embodiments only and are not considered as limitation of the disclosure. Furthermore, the same reference symbol is used to represent the same component throughout the drawings. In the drawings.

DETAILED DESCRIPTION

Technical solutions in the embodiments of the disclosure will be clearly and completely described below with reference to the drawings in the embodiments of the disclosure. It is apparent that the described embodiments are part of the embodiments of the disclosure, rather than all of the embodiments. Based on the embodiments of the disclosure, all other embodiments obtained by those of ordinary skill in the art without paying any creative work shall fall within the scope of protection of the disclosure.

Figure 2:
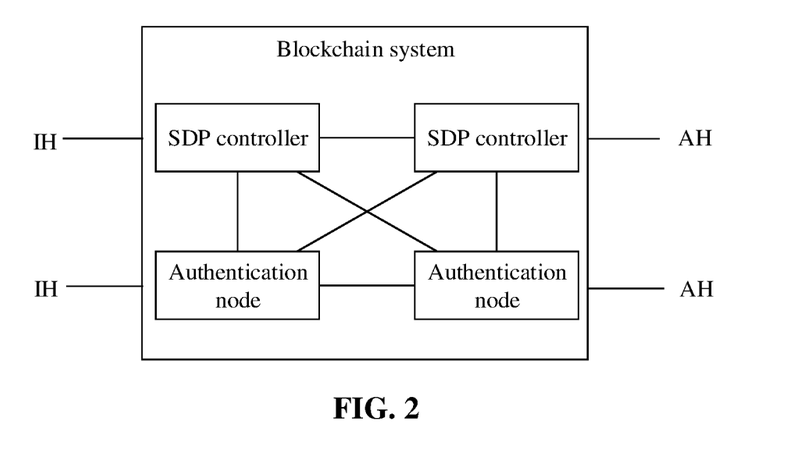
FIG. 2 illustrates an architecture of a blockchain system according to an embodiment of the disclosure.
Figure 3:
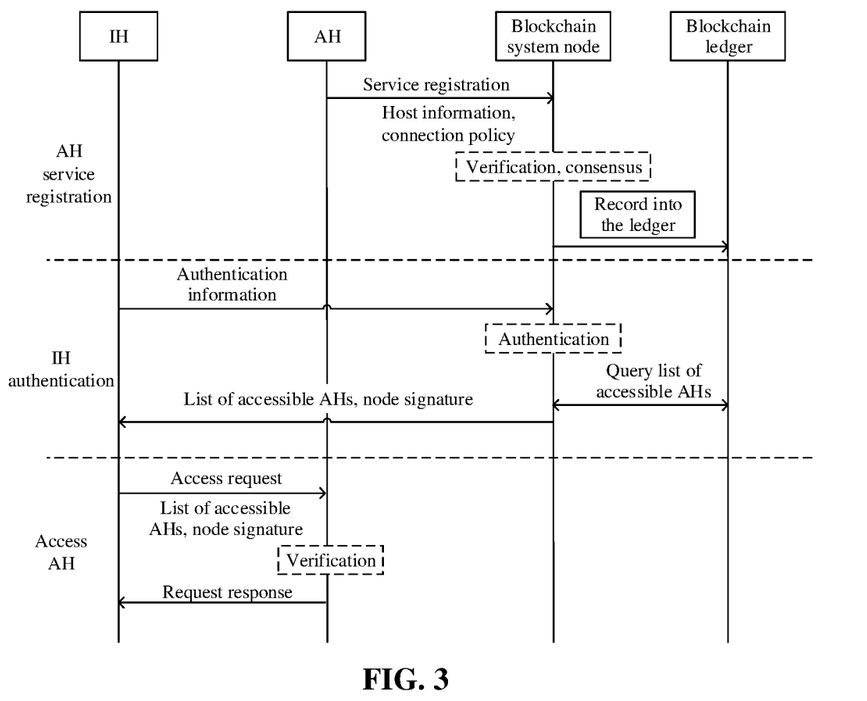
FIG. 3 is a thread diagram of a blockchain-based access control of SDP according to an embodiment of the disclosure.
Figure 4:
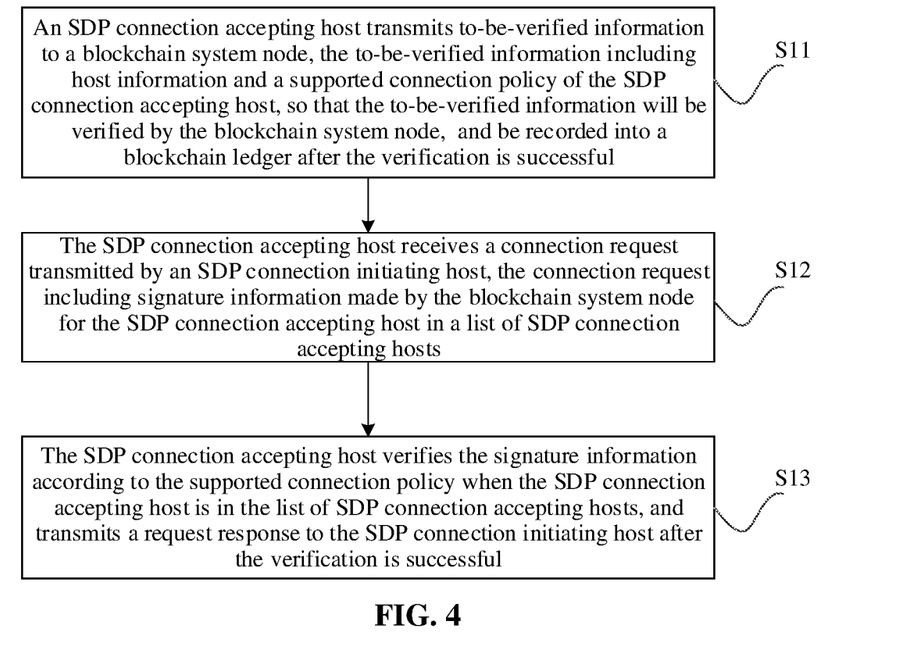
FIG. 4 is a flowchart of a method for blockchain-based access control of SDP according to an embodiment of the disclosure.

With the aid of FIG. 1, FIG. 2 and FIG. 3, and with reference to FIG. 4, there is provided a method for blockchain-based access control of Software Defined Perimeter (SDP), including the following operations S11 to S13.

At S11, an SDP connection accepting host transmits to-be-verified information to a blockchain system node. The to-be-verified information includes host information and a supported connection policy of the SDP connection accepting host, so that the to-be-verified information will be verified by the blockchain system node, and be recorded into a blockchain ledger after the verification is successful.

At S12, the SDP connection accepting host receives a connection request transmitted by an SDP connection initiating host. The connection request includes signature information made by the blockchain system node for the SDP connection accepting host in a list of SDP connection accepting hosts.

At S13, the SDP connection accepting host verifies the signature information according to the supported connection policy when the SDP connection accepting host is in the list of SDP connection accepting hosts, and transmits a request response to the SDP connection initiating host after the verification is successful.

In the embodiment, the host information of the SDP connection accepting host includes at least one of: an Internet Protocol (IP) address, a port, or protocol information, and the supported connection policy includes at least one of: a login identity (ID), an IP address and a geographic location of an access user, or a blockchain node verification or endorsement policy. The SDP connection accepting host transmits the host information (such as the IP address, the port and the protocol information, or the like) and the supported connection policy (e.g., information such as the login ID, the IP address and the geographic location of the supported access user and the blockchain node verification/ endorsement policy, or the like) of the SDP connection accepting host to the blockchain system node.

Preferably, the signature information made by the blockchain system node for the SDP connection accepting host in the list of SDP connection accepting hosts includes signatures made by one or more blockchain system nodes determined according to the blockchain node verification or endorsement policy.

Preferably, a signature of the SDP connection accepting host for the host information and the supported connection policy of the SDP connection accepting host may also be transmitted to the blockchain system node, and the blockchain node verifies the information submitted by the SDP connection accepting host and the signatures thereof. After the verification is successful, the blockchain node records the host information and the supported connection policy of the SDP connection accepting host submitted by the SDP connection accepting host into the blockchain ledger.

With reference to FIG. 2, the blockchain system node is formed by a SDP controller and an authentication node connected to each other, and both the SDP controller and the authentication node are blockchain nodes. The SDP connection accepting host and the SDP connection initiating host may submit a transaction to the blockchain, and may read ledger data from the blockchain.

Specifically, the SDP connection initiating host submits an identity authentication request to the blockchain system node by: the SDP connection initiating host signing a timestamp with its own private key.

Specifically, the blockchain system node verifies the signature and timestamp in the identity authentication request submitted by the SDP connection initiating host. The SDP connection initiating host signs the timestamp with its own private key. The signature and timestamp are verified when the SDP connection initiating host signs the timestamp with its own private key.

In the embodiment, when the SDP connection initiating host and an authentication node A1 share a user name and secret information, the identity authentication request includes a KDF (timestamp, username, password), and the KDF (timestamp, username, password) is encrypted with a public key of the authentication node A1. At S4, the blockchain system node verifies whether the KDF (timestamp, username, password) in the identity authentication request submitted by the SDP connection initiating host is correct.

Specifically, when the SDP connection initiating host and the authentication node A1 share the user name and secret information such as a user password, the authentication request includes the KDF (timestamp, username, password), and the KDF (timestamp, username, password) is encrypted with the public key of the authentication node A1, for example, Epk_A1 (KDF (time stamp, username, password)).

The KDF is a way to implement key stretching, specifically, one or more keys are derived from a master key, a password, or a passphrase, and a Pseudo Random Function (PRF) used during derivation may be a certain hash algorithm.

For example, PBKDF2 is an algorithm for deriving a key based on a password, and requires consumption of much computing power, to prevent encryption from being brute-force cracked. Scrypt is a password-based KDF algorithm, and requires consumption of more resources than the PBKDF2, to effectively prevent a dedicated hardware ASIC/ FPGA from being brute-force cracked. The PBKDF2 algorithm is used inside the Scrypt. However, a set of bit data may be maintained inside the Scrypt for a long time, and these data may be obtained by repeatedly encrypting (Salsa 20, a stream password) in a process of generating a complex salt.

Specifically, when the SDP connection initiating host has a token provided by an authentication node A2, the identity authentication request includes the token, and the token is encrypted with a public key of the authentication node A2. The blockchain system node verifies whether the token in the identity authentication request submitted by the SDP connection initiating host is correct. After the identity authentication is successful, the blockchain node searches SDP connection accepting hosts and policy information in the ledger, and returns a list of SDP connection accepting hosts accessible to the SDP connection initiating host as a response result to the SDP connection initiating host. A signature made by the blockchain node for the response result is included in the response result and the signature may include signatures made by one or multiple nodes. When the SDP connection accepting host specifies a verification/endorsement node in the policy, the node specified by the SDP connection accepting host is required to sign the response result.

Specifically, the token means a flag or mark, and is called as Token in the IT field. In computer identity authentication, the token (temporary) is usually used as an invitation and used to log in a system. Before transmission of some data, a cipher should be checked first, and different ciphers are authorized for different data operations. For example, four types of data packets, i.e., a token packet, a data packet, a handshake packet and a special packet, are defined in a Universal Serial Bus (USB) 1.1 protocol. Continuous exchange of data between a host and a USB device may include three stages: in the first stage, the token packet is transmitted by the host, different token packets have different contents (different ciphers) and may instruct the device to perform different operations; in the second phase, the data packet is transmitted; and in the third phase, a handshake packet is returned by the device.

In the embodiment, the SDP connection initiating host submits an access request to the SDP connection accepting host, and the access request includes the list of SDP connection accepting hosts accessible to the SDP connection initiating host and the signature information made by the blockchain node. When the SDP connection accepting host is in the list of SDP connection accepting hosts accessible to the SDP connection initiating host, the SDP connection accepting host verifies the signature information according to its own policy published in the blockchain ledger, for example, the SDP connection accepting host verifies whether the signature is generated by a node specified in the policy. When the verification is successful, a connection is established; otherwise, no response is made.

In the embodiment, the SDP connection accepting host transmits the host information and the supported connection policy of the SDP connection accepting host to the blockchain system node; blockchain node verification and consensus are performed on the host information and the supported connection policy of the SDP connection accepting host, and the host information and the supported connection policy of the SDP connection accepting host after the blockchain node verification and consensus are recorded into the blockchain ledger. The SDP connection initiating host submits the identity authentication request to the blockchain system node; the blockchain system node verifies the identity authentication request submitted by the SDP connection initiating host, the verification of the identity authentication request includes searching, in the blockchain, for the list of SDP connection accepting hosts accessible to the SDP connection initiating host, and the blockchain system node returns the list of SDP connection accepting hosts to the SDP connection initiating host. The SDP connection initiating host initiates the connection request to the SDP connection accepting hosts in the list of SDP connection accepting hosts, the connection request includes the signature of the blockchain system node for the SDP connection accepting host in the list of SDP connection accepting hosts; and the SDP connection accepting host verifies the connection request initiated by the SDP connection initiating host, and provides access services to the SDP connection initiating host after the verification is successful. According to the embodiment of the disclosure, SDP services are provided to the customer in a blockchain manner, and authentication, request, or the like are verified, so that on one hand, the SDP controller may be prevented from being attacked by Distributed Denial of Service (DDoS), and on the other hand, the SDP controller may be prevented from implementing an incorrect authorization.

Figure 5:
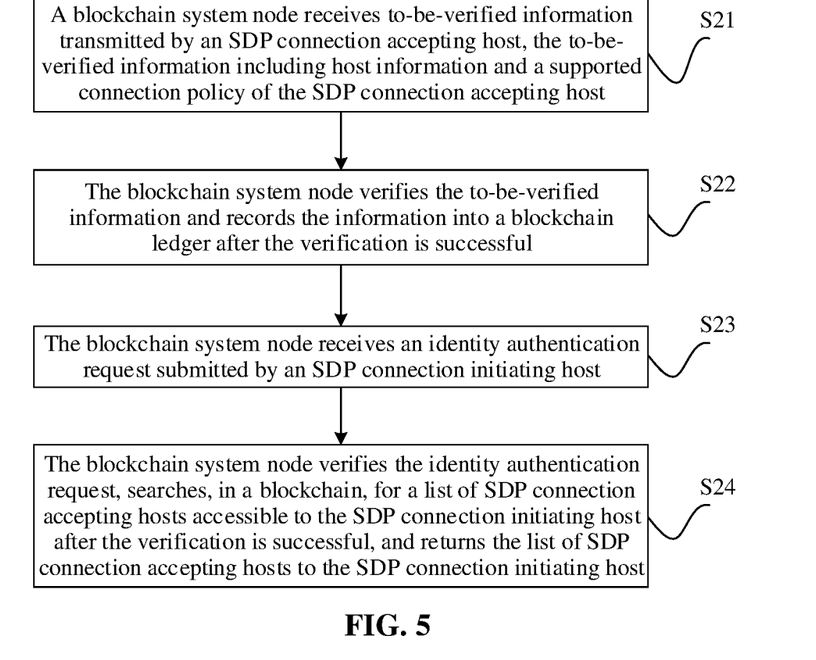
FIG. 5 is a flowchart of another method for blockchain-based access control of SDP according to an embodiment of the disclosure.

With the aid of FIG. 1, FIG. 2 and FIG. 3, and with reference to FIG. 5, there is provided another method for blockchain-based access control of SDP, including the following operations S21 to S24.

At S21, a blockchain system node receives to-be-verified information transmitted by an SDP connection accepting host. The to-be-verified information includes host information and a supported connection policy of the SDP connection accepting host.

At S22, the blockchain system node verifies the to-be-verified information and records the information into a blockchain ledger after the verification is successful.

At S23, the blockchain system node receives an identity authentication request submitted by an SDP connection initiating host.

At S24, the blockchain system node verifies the identity authentication request, and searches, in a blockchain, for a list of SDP connection accepting hosts accessible to the SDP connection initiating host after the verification is successful, and returns the list of SDP connection accepting hosts to the SDP connection initiating host.

In the embodiment, the to-be-verified information further includes a signature of the SDP connection accepting host for the host information and the supported connection policy.

Specifically, when the SDP connection initiating host signs a timestamp with its own private key in the identity authentication request, the operation of verifying, by the blockchain system node, the identity authentication request includes the following operation.

The blockchain system node verifies the signature and timestamp submitted by the SDP connection initiating host.

Specifically, when the identity authentication request includes a KDF or encrypted information of the KDF with a public key of an authentication node A1, the operation of verifying, by the blockchain system node, the identity authentication request includes the following operation.

The blockchain system node verifies whether the KDF is correct.

Specifically, when the identity authentication request includes a token or encrypted information of the token with a public key of an authentication node A2, the operation of verifying, by the blockchain system node, the identity authentication request includes the following operation.

The blockchain system node verifies whether the token is correct.

The method for blockchain-based access control of SDP in the embodiment is an implementation at the blockchain system node side corresponding to the method shown in FIG. 4, and specific implementation details are the same as descriptions of the method shown in FIG. 4, and are not elaborated here.

Figure 6:
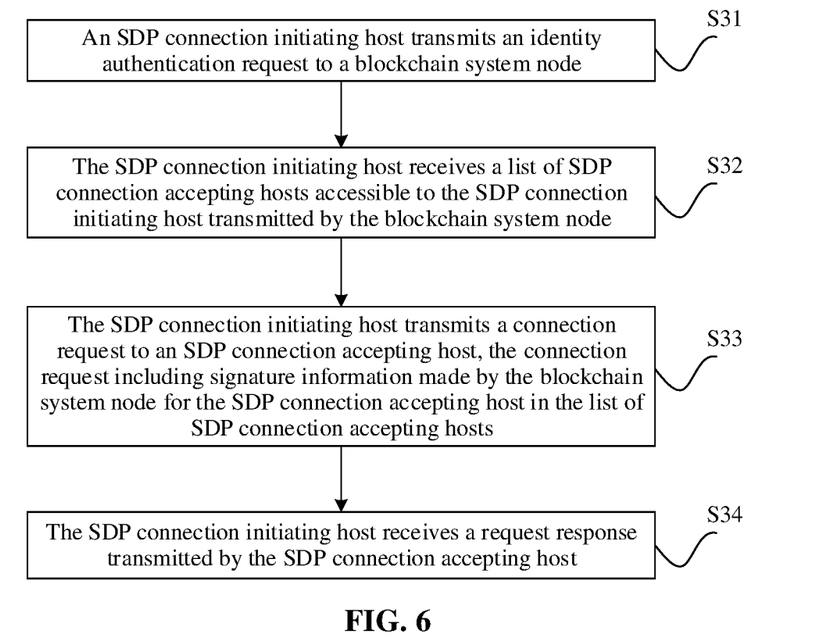
FIG. 6 is a flowchart of yet another method for blockchain-based access control of SDP according to an embodiment of the disclosure.

With the aid of FIG. 1, FIG. 2 and FIG. 3, and with reference to FIG. 6, there is provided yet another method for blockchain-based access control of SDP, including the following operations S31 to S34.

At S31, an SDP connection initiating host transmits an identity authentication request to a blockchain system node.

At S32, the SDP connection initiating host receives a list of SDP connection accepting hosts accessible to the SDP connection initiating host transmitted by the blockchain system node.

At S32, the SDP connection initiating host transmits a connection request to an SDP connection accepting host in the list of SDP connection accepting hosts. The connection request includes signature information made by the blockchain system node for the SDP connection accepting host in the list of SDP connection accepting hosts.

At S34, the SDP connection initiating host receives a request response transmitted by the SDP connection accepting host.

Specifically, the SDP connection initiating host signs a timestamp with its own private key in the identity authentication request.

Specifically, when the SDP connection initiating host and an authentication node A1 share a user name and secret information, the identity authentication request includes a KDF or encrypted information of the KDF with a public key of the authentication node A1. When the SDP connection initiating host has a token provided by an authentication node A2, the identity authentication request includes the token or encrypted information of the token with a public key of the authentication node A2.

Preferably, the signature information made by the blockchain system node for the SDP connection accepting host in the list of SDP connection accepting hosts may include signatures made by one or more blockchain system nodes determined according to a blockchain node verification or endorsement policy.

The method for blockchain-based access control of SDP in the embodiment is an implementation at the SDP connection initiating host side corresponding to the method shown in FIG. 4, and specific implementation details are the same as descriptions of the method shown in FIG. 4, and are not elaborated here.

Figure 7:
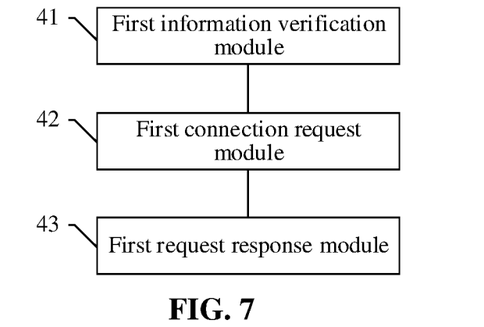
FIG. 7 is a schematic diagram of a system for blockchain-based access control of SDP according to an embodiment of the disclosure.

With the aid of FIG. 1, FIG. 2 and FIG. 3, and with reference to FIG. 7, there is provided a system for blockchain-based access control of SDP, including a first information verification module 41, a first connection request module 42, and a first request response module 43.

The first information verification module 41 is configured to enable an SDP connection accepting host to transmit to-be-verified information to a blockchain system node. The to-be-verified information includes host information and a supported connection policy of the SDP connection accepting host, so that the to-be-verified information will be verified by the blockchain system node, and be recorded into a blockchain ledger after the verification is successful.

The first connection request module 42 is configured to enable the SDP connection accepting host to receive a connection request transmitted by an SDP connection initiating host. The connection request includes signature information made by the blockchain system node for the SDP connection accepting host in a list of SDP connection accepting hosts.

The first request response module 43 is configured to enable the SDP connection accepting host to verify the signature information according to the supported connection policy when the SDP connection accepting host is in the list of SDP connection accepting hosts and transmit a request response to the SDP connection initiating host after the verification is successful.

Specifically, the host information of the SDP connection accepting host includes at least one of: an IP address, a port, or protocol information; and the supported connection policy includes at least one of: a login ID, an IP address and a geographic location of an access user, or a blockchain node verification or endorsement policy.

Preferably, the signature information made by the blockchain system node for the SDP connection accepting host in the list of SDP connection accepting hosts include signatures made by one or more blockchain system nodes determined according to the blockchain node verification or endorsement policy.

Specifically, the to-be-verified information further includes a signature of the SDP connection accepting host for the host information and the supported connection policy.

The system for blockchain-based access control of SDP in the embodiment of the disclosure is a product implementation solution corresponding to the method shown in FIG. 4, specific implementation details are the same as the method shown in FIG. 4, and are not elaborated here.

Figure 8:
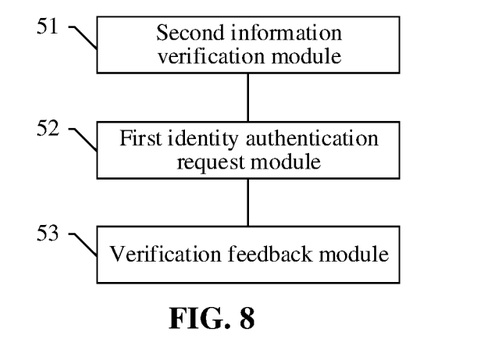
FIG. 8 is a schematic diagram of another system for blockchain-based access control of SDP according to an embodiment of the disclosure.

With the aid of FIG. 1, FIG. 2 and FIG. 3, and with reference to FIG. 8, there is provided a system for blockchain-based access control of SDP, including a second information verification module 51, a first identity authentication request module 52, and a verification feedback module 53.

The second information verification module 51 is configured to: receive to-be-verified information transmitted by an SDP connection accepting host, the to-be-verified information including host information and a supported connection policy of the SDP connection accepting host; and verify the to-be-verified information and record the information into a blockchain ledger after the verification is successful.

The first identity authentication request module 52 is configured to receive an identity authentication request submitted by an SDP connection initiating host.

The verification feedback module 53 is configured to: verify the identity authentication request; search, in a blockchain, for a list of SDP connection accepting hosts accessible to the SDP connection initiating host after the verification is successful; and return the list of SDP connection accepting hosts to the SDP connection initiating host.

Specifically, the to-be-verified information further includes a signature of the SDP connection accepting host for the host information and the supported connection policy.

Specifically, when the SDP connection initiating host signs a timestamp with its own private key in the identity authentication request, the operation of verifying the identity authentication request includes the following operation.

The signature and timestamp submitted by the SDP connection initiating host are verified.

Specifically, when the identity authentication request includes a KDF or encrypted information of the KDF with a public key of an authentication node A1, the operation of verifying the identity authentication request includes the following operation.

Whether the KDF is correct, is verified.

Specifically, when the identity authentication request includes a token or encrypted information of the token with a public key of an authentication node A2, the operation of verifying the identity authentication request includes the following operation.

Whether the token is correct, is verified.

The system for blockchain-based access control of SDP in the embodiment of the disclosure is a product implementation solution corresponding to the method shown in FIG. 5, specific implementation details are the same as the method shown in FIG. 5, and are not elaborated here.

Figure 9:
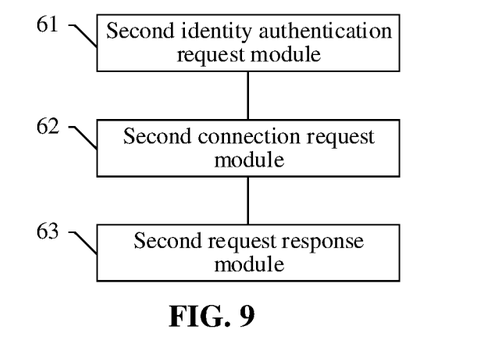
FIG. 9 is a schematic diagram of yet another system for blockchain-based access control of SDP according to an embodiment of the disclosure.

With the aid of FIG. 1, FIG. 2 and FIG. 3, and with reference to FIG. 9, there is provided a system for blockchain-based access control of SDP, including a second identity authentication request module 61, a second connection request module 62, and a second request response module 63.

The second identity authentication request module 61 is configured to transmit an identity authentication request to a blockchain system node, and enable an SDP connection initiating host to receive a list of SDP connection accepting hosts accessible to the SDP connection initiating host transmitted by the blockchain system node.

The second connection request module 62 is configured to transmit a connection request to an SDP connection accepting host in the list of SDP connection accepting hosts. The connection request includes signature information made by the blockchain system node for the SDP connection accepting host in the list of SDP connection accepting hosts.

The second request response module 63 is configured to receive a request response transmitted by the SDP connection accepting host.

Specifically, the SDP connection initiating host signs a timestamp with its own private key in the identity authentication request.

Specifically, when the SDP connection initiating host and an authentication node A1 share a user name and secret information, the identity authentication request includes a KDF or encrypted information of the KDF with a public key of the authentication node A1.

Specifically, when the SDP connection initiating host has a token provided by an authentication node A2, the identity authentication request includes the token or encrypted information of the token with a public key of the authentication node A2.

The system for blockchain-based access control of SDP in the embodiment of the disclosure is a product implementation solution corresponding to the method shown in FIG. 6, specific implementation details are the same as the method shown in FIG. 6, and are not elaborated here.

An embodiment of the disclosure provides an SDP connection accepting host, including a processor and a memory having stored thereon a program executable on the processor. The processor is configured to implement operations of the method for blockchain-based access control of SDP shown in FIG. 4 or any possible implementation thereof, when the program is executed by the processor.

An embodiment of the disclosure provides a blockchain system node, including a processor and a memory having stored thereon a program executable on the processor. The processor is configured to implement operations of the method for blockchain-based access control of SDP shown in FIG. 5 or any possible implementation thereof, when the program is executed by the processor.

An embodiment of the disclosure provides an SDP connection initiating host, including a processor and a memory having stored thereon a program executable on the processor. The processor is configured to implement operations of the method for blockchain-based access control of SDP shown in FIG. 6 or any possible implementation thereof, when the program is executed by the processor.

An embodiment of the disclosure provides a computer-readable storage medium having stored thereon a computer program that, when being executed by a processor, causes the processor to implement operations of the method for blockchain-based access control of SDP shown in FIG. 4 or any possible implementation thereof, or causes the processor to implement operations of the method for blockchain-based access control of SDP shown in FIG. 5 or any possible implementation thereof, or causes the processor to implement operations of the method for blockchain-based access control of SDP shown in FIG. 6 or any possible implementation thereof.

Specifically, the computer-readable storage medium may be any usable medium accessible by a computer, or a data storage device including a server or a data center integrated with one or more usable media, or the like. The usable medium may be a magnetic medium (such as a floppy disk, a hard disk, or a magnetic tape), an optical medium (such as a Digital Versatile Disk (DVD)), or a semiconductor medium (such as a Solid State Disk (SSD)), or the like.

Specifically, the processor may be implemented by hardware, or by software.

When the processor is implemented by hardware, the processor may be a logic circuit, an integrated circuit, or the like. When the processor is implemented by software, the processor may be a general-purpose processor implemented by reading software codes stored in a memory, and the memory may be integrated in the processor, and may be located outside the processor and exist independently.

All or part of the above embodiments may be implemented by software, hardware, firmware, or any combination thereof. When the embodiments are implemented by software, all or part of the embodiments may be implemented in form of a computer program product. The computer program product includes one or more computer instructions. When the computer program instructions are loaded and executed on a computer, all or part of the processes or functions according to the embodiments of the disclosure are generated. The computer may be a general-purpose computer, a special-purpose computer, a computer network, or another programmable device. The computer instructions may be stored in a computer-readable storage medium, or transmitted from one computer-readable storage medium to another computer-readable storage medium, for example, the computer instructions may be transmitted from one website, computer, server, or data center to another website, computer, server, or data center in a wired (e.g., coaxial cable, optical fiber, Digital Subscriber Line (DSL)) or wireless (e.g., infrared, wireless, microwave, or the like) way.

Specifically, a Central Processing Unit (CPU) performs various processes according to a program stored in a Read-Only Memory (ROM) or a program loaded from a storage portion to a Random Access Memory (RAM). In the RAM, data required for the CPU to perform various processes or the like, is also stored as required. The CPU, ROM and RAM are connected to each other via a bus. An input/output interface is also connected to the bus.

The following components are connected to the input/output interface: an input portion (including a keyboard, a mouse, or the like), an output portion (including a display such as a Cathode Ray Tube (CRT), a Liquid Crystal Display (LCD), a loudspeaker, or the like), a storage portion (including a hard disk, or the like), a communication portion (including a network interface card, such as a Local Area Network (LAN) card, a modem, or the like). The communication portion performs communication processes via a network such as the Internet. A driver may also be connected to the input/output interface as required. A removable medium such as a magnetic disk, an optical disk, a magneto-optical disk, a semiconductor memory, or the like may be installed on the driver as required, such that a computer program read therefrom is installed into the storage portion as required.

When the above series of processes are implemented by software, a program constituting the software is installed from a network such as the Internet or a storage medium such as a removable medium.

It should be understood by those skilled in the art that such storage medium is not limited to the removable medium where the program is stored, distributed separately from a device to provide the program to the user. Examples of the removable medium include a magnetic disk (including a floppy disk (registered trademark)), an optical disk (including a Compact Disk Read-Only Memory (CD-ROM) and a DVD), a magneto-optical disk (including a Mini-Disk (MD) (registered trademark)), and a semiconductor memory. Or, the storage medium may be a ROM, a hard disk included in the storage portion, or the like, where programs are stored and are distributed to the user along with devices containing them.

It should be understood by those skilled in the art that the above modules or operations of the embodiments of the disclosure may be implemented by a general-purpose computing device, and may be concentrated on a single computing device or distributed on a network formed by multiple computing devices; optionally, the above modules or operations may be implemented by program codes executable by the computing device, so that the above modules or operations may be stored in the storage medium and executed by the computing device. In some cases, the illustrated or described operations may be performed in an order different from the order described here, or the illustrated or described operations are made into various integrated circuit modules respectively, or multiple modules or operations in the illustrated or described operations are made into a single integrated circuit module. In this way, the embodiments of the disclosure are not limited to any specific combination of hardware and software.

The embodiments of the disclosure are described above with reference to the drawings. However, the disclosure is not limited to the above specific implementations, and the above specific implementations are merely illustrative, rather than limitation. Many forms made by those of ordinary skill in the art under the inspiration of the disclosure, without departing from the principle of the disclosure and the scope of protection of the claims, shall fall with the scope of protection of the disclosure.

The invention claimed is:

1. A method for blockchain-based access control of Software Defined Perimeter (SDP), comprising:
   transmitting, by an SDP connection accepting host, to-be-verified information to a blockchain system node, the to-be-verified information comprising host information and a supported connection policy of the SDP connection accepting host, so that the to-be-verified information will be verified by the blockchain system node, and be recorded into a blockchain ledger after the verification is successful, wherein the host information of the SDP connection accepting host comprises at least one of: an Internet Protocol (IP) address, a port, or protocol information; and the supported connection policy comprises at least one of: a login identity (ID), an IP address and a geographic location of an access user, or a blockchain node verification or endorsement policy;
   receiving, by the SDP connection accepting host, a connection request transmitted by an SDP connection initiating host, the connection request comprising signature information made by the blockchain system node for the SDP connection accepting host in a list of SDP connection accepting hosts, wherein the signature information made by the blockchain system node for the SDP connection accepting host in the list of SDP connection accepting hosts comprises signatures made by one or more blockchain system nodes determined according to the blockchain node verification or endorsement policy; and
   verifying, by the SDP connection accepting host, the signature information according to the supported connection policy when the SDP connection accepting host is in the list of SDP connection accepting hosts, and transmitting, by the SDP connection accepting host, a request response to the SDP connection initiating host after the verification is successful.

2. The method for blockchain-based access control of SDP of claim 1, wherein the to-be-verified information further comprises a signature of the SDP connection accepting host for the host information and the supported connection policy.

3. A Software Defined Perimeter (SDP) connection accepting host for implementing the method of claim 1, comprising a processor and a memory having stored thereon a program executable on the processor, wherein the processor is configured to execute the program stored in the memory to perform steps of the method.

4. A method for blockchain-based access control of Software Defined Perimeter (SDP), comprising:
   receiving, by a blockchain system node, to-be-verified information transmitted by an SDP connection accepting host, the to-be-verified information comprising host information and a supported connection policy of the SDP connection accepting host;
   verifying, by the blockchain system node, the to-be-verified information and recording the information into a blockchain ledger after the verification is successful;
   receiving, by the blockchain system node, an identity authentication request submitted by an SDP connection initiating host; and
   verifying, by the blockchain system node, the identity authentication request, searching in a blockchain, by the blockchain system node, for a list of SDP connection accepting hosts accessible to the SDP connection initiating host after the verification is successful, and returning, by the blockchain system node, the list of SDP connection accepting hosts to the SDP connection initiating host,
   wherein when the SDP connection initiating host signs a timestamp with its own private key in the identity authentication request, verifying, by the blockchain system node, the identity authentication request comprises:
      verifying, by the blockchain system node, a signature and timestamp submitted by the SDP connection initiating host.

5. The method for blockchain-based access control of SDP of claim 4, wherein the to-be-verified information further comprises a signature of the SDP connection accepting host for the host information and the supported connection policy.

6. The method for blockchain-based access control of SDP of claim 4, wherein when the identity authentication request comprises a Key Derivation Function (KDF) or encrypted information of the KDF with a public key of an authentication node, verifying, by the blockchain system node, the identity authentication request further comprises:
   verifying, by the blockchain system node, whether the KDF is correct.

7. The method for blockchain-based access control of SDP of claim 4, wherein when the identity authentication request comprises a token or encrypted information of the token with a public key of an authentication node, verifying, by the blockchain system node, the identity authentication request further comprises:

verifying, by the blockchain system node, whether the token is correct.

8. A blockchain system node for implementing the method of claim 4, comprising a processor and a memory having stored thereon a program executable on the processor, wherein the processor is configured to execute the program stored in the memory to perform steps of the method.

9. A method for blockchain-based access control of Software Defined Perimeter (SDP), comprising:

transmitting, by an SDP connection initiating host, an identity authentication request to a blockchain system node;

receiving, by the SDP connection initiating host, a list of SDP connection accepting hosts accessible to the SDP connection initiating host transmitted by the blockchain system node;

transmitting, by the SDP connection initiating host, a connection request to an SDP connection accepting host in the list of SDP connection accepting hosts, the connection request comprising signature information made by the blockchain system node for the SDP connection accepting host in the list of SDP connection accepting hosts, wherein the signature information made by the blockchain system node for the SDP connection accepting host in the list of SDP connection accepting hosts comprises signatures made by one or more blockchain system nodes determined according to a blockchain node verification or endorsement policy; and receiving, by the SDP connection initiating host, a request response transmitted by the SDP connection accepting host.

10. The method for blockchain-based access control of SDP of claim 9, wherein the SDP connection initiating host signs a timestamp with its own private key in the identity authentication request.

11. The method for blockchain-based access control of SDP of claim 9, wherein when the SDP connection initiating host and an authentication node share a user name and secret information, the identity authentication request comprises a KDF or encrypted information of the KDF with a public key of the authentication node.

12. The method for blockchain-based access control of SDP of claim 9, wherein when the SDP connection initiating host has a token provided by an authentication node the identity authentication request comprises the token or encrypted information of the token with a public key of the authentication node.

13. A Software Defined Perimeter (SDP) connection initiating host for implementing the method of claim 9, comprising a processor and a memory having stored thereon a program executable on the processor, wherein the processor is configured to execute the program stored in the memory to perform steps of the method.

* * * * *